United States Statutory Invention Registration [19]

[11] Reg. Number: H238

Adams [43] Published: Mar. 3, 1987

[54] WARHEAD CASING OF NOVEL FRAGMENTATION DESIGN

[75] Inventor: John C. Adams, Lancaster, Pa.

[73] Assignee: The United States of America as represented by the Secretary of the Navy, Washington, D.C.

[21] Appl. No.: 886,858

[22] Filed: Jul. 18, 1986

[51] Int. Cl.[4] ..... F42B 13/18

[52] U.S. Cl. ..... 102/493; 29/1.23

*Primary Examiner*—Harold J. Tudor

*Attorney, Agent, or Firm*—Robert F. Beers; Elmer E. Goshorn

[57] ABSTRACT

An improved explosive warhead casing of novel fragmentation design that can be tailored for use with an increased number of weapons and thus impact a greater variety of targets with enhanced effectiveness. The casing is generally made up of a plurality of stacked ring-like elements. The adjacent outer peripheral portions of adjoining stacked elements are metallurgically bonded together in precise fashion such as by a laser device so as to form a unitized casing. A series of relatively spaced and longitudinally extending grooves are preferably formed on and about both the interior and exterior annular surfaces of the casing. Further, the series of grooves together with the bonds between the elements all cooperate to form a plurality of novel-shaped fragments where the configuration of each explosively formed fragment is subject to less distortion, metal flow, micro cracking, etc.; thereby approaching, with greater degree, the intended design configuration for each fragment. Since the casing is made up of bonded together elements, it can be formed by more than one manufacturing technique and different materials can be incorporated in the casing structure during its manufacture. Moreover, the casing is not limited to the usual cylindrical shaped configuration as its final shape or the formation of only one fragment grid pattern therein.

23 Claims, 11 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

WARHEAD CASING OF NOVEL FRAGMENTATION DESIGN

This invention concerns an explosive warhead casing, and, more particularly, it relates to an improved explosive warhead casing of novel fragmentation design for forming a plurality of fragments with enhanced effectiveness for striking a target.

BACKGROUND OF THE INVENTION

Various fragmentable warhead casings have been designed in the past. For example, U.S. Pat. No. 358,627 to G. F. Simonds discloses a roll formed projectile. The projectile in being roll formed is made up of bar stock. U.S. Pat. No. 3,566,794 to J. Pearson et al. relates to an explosive fragmentable warhead casing. The casing is of double-wall construction such that the interior annular surface of each wall is provided with an intersecting series of helical grooves to form a diamond-shaped groove pattern. Since the double walls are rotatable relative to each other about the casing axis, the groove pattern of each wall is adjusted relative to the other groove pattern so as to control the shape and mass of the fragments produced by the casing when subjected to impulsive loading during casing use. U.S. Pat. No. 4,068,590 to J. Pearson relates to an explosive warhead casing of single wall construction. The interior annular surface of the casing is provided with a diamond-shaped groove pattern. The cross-sectional shape of each groove of the pattern is of nonsymmetrical configuration. Consequently, by reason of the cross-sectional shape of each groove, the particular shape and mass of each fragment produced by the casing when subject to impulsive loading is reasonably predictable. U.S. Pat. No. 4,312,274 to L. Zernow concerns an explosive warhead casing of liner/casing construction. The casing is provided with an interior annular surface having a diamond-shaped groove pattern. Similarly, the exterior surface of the liner is also provided with a confronting diamond-shaped groove pattern. Inasmuch as the casing and liner are movable relative to each other about the casing axis and inasmuch as the groove pattern of the liner can be filled with a fluid, the shape and size of the fragments produced by the casing are selectively controllable depending on whether the target to be impacted by a weapon incorporating the casing is considered hard or soft.

The aforementioned references failed to recognize that a fragmentable warhead with greater fragmentation control is achievable if the casing (from which a plurality of fragments are produced) is initially not a one-piece sleeve as was the practice in the past. In other words, if the warhead fragmentable casing is initially made up of a plurality of metallurgically bonded, interconnected and selectively arranged elements about the warhead axis. To this end, each casing is preferably initially formed from a plurality of stacked rings or from a progressively mandrel wound endless length of rod or wire. Then the adjacent peripheral contacting surfaces of adjoining circumferential portions are precisely laser welded together so as to form a unique unitized fragmentable casing design. By reason of this design, a casing can be formed not only with minimal machining requirements, but also with greater selection as to diameter, thickness, mass and material used so as to be able to form fragments with greater control as to mass, shape and size in meeting weapon and target requirements.

Perhaps one of the reasons the prior art failed to recognize the usefulness in forming a unitized casing of metallurgically bonded and interconnected elements is that the advantages of laser technology had not yet been fully realized in relation to warhead casing manufacture.

However, none of the aforediscussed references, whether taken alone or in any combination, remotely suggest the improved explosive warhead casing of single wall construction and enhanced fragmentation design. The casing is generally made up of a plurality of stacked ring-like means. Adjacent outer peripheral portions of adjoining ring-like means of the plurality are metallurgically bonded together so as to form a casing of unitized construction between its ends. A series of relatively spaced and longitudinally extending grooves are formed on and about the interior annular surface of the casing. By reason of the interfacial contact between adjoining ring-like means at the interior of the casing together with the first series of grooves, the casing is provided with an internal grid pattern. A second series of relatively spaced and longitudinally extending grooves are preferably formed on and about the external annular surface of the casing. Because of the second series of grooves together with the bond between adjoining ring-like means, the casing is provided in effect with an external grid pattern. By reason of these patterns, the fragments produced by the casing when subject to impulsive loading of an explosion are of a more predictable shape and mass than heretofore possible thereby resulting in each produced fragment more closely approximating the intended shape and mass of a designed fragment. Consequently, the improved casing can be tailored with precision to meet a wider range of fragment shape and mass in meeting both target and weapon requirements.

SUMMARY OF THE INVENTION

An object of the invention is to provide an improved explodable warhead casing of fragmentation design that is made up of metallurgically bonded and interconnected components and so requires less machining in forming same.

Another object of the invention is to provide an improved fragmentable explosive warhead casing that is made up of bonded and interconnected components all of which contributes to the casing in being of tailored construction as to the material selected and/or the configuration of the casing itself in meeting various weapon and target requirements.

Still another object of the invention is to provide an improved fragmentable explosive warhead casing where any of the fragments produced by the casing when exploded not only have a greater velocity but also have an explosive formed shape and mass that more closely approximates its intended shape and mass as originally designed.

Yet another object of the invention is to provide an improved fragmentable explosive warhead casing in which the casing can be designed with a greater range in configuration, size, thickness and mass while at the same time the fragments produced by the casing also have a greater range in shape, size, thickness and mass than heretofore possible.

In summary, the improved explosive warhead casing of fragmentation design is generally made up of a plurality of stacked ring-like means. Adjacent outer peripheral portions of adjoining ring-like means are preferably metallurgically bonded together so as to form a casing of desired configuration and unitized construction. By reason of the bond between adjoining ring-like means the casing is impervious between the inner and outer surefaces thereof. Also, in forming the bond between adjoining ring-like means, the depth of the bond is substantially less than the interfacial contact between adjacent inner portions of adjoining ring-like means.

A series of relatively spaced and longitudinally extending grooves are formed on and about the interior annular surface of the casing. By reason of the series of grooves intersecting the interfacial contact between adjoining ring-like means, an internal grid pattern is formed in the casing between its ends. A second series of relatively spaced and longitudinally extending grooves are preferably formed on and about the outer annular surface of the casing. The depth of each groove of the second series is less than the depth of the bond between adjoining ring-like means. By reason of the second series of grooves intersecting the bond between adjoining ring-like means, an external grid pattern is in effect formed on the outer annular surface of the casing.

Because of the first and second series of grooves, together with the bond between adjacent outer peripheral portions of adjoining ring-like means and the interfacial contact between adjacent inner peripheral portions of adjoining ring-like means, the shape of the fragments is controlled as produced by the casing when the casing is exploded. Hence, if the first and second series of grooves are disposed at ninety degrees (90°) to a plane transverse of the casing, block-shaped fragments are produced. On the other hand, if the first and second series of grooves are radially or nonradially aligned, the particular block-shape of each fragment is readily controlled. Moreover, if each one of the first and second series of grooves is inclined at an acute angle in relation to a plane transverse of the casing, diamond-shaped fragments are produced.

By reason of the casing being subjected to only grooves being formed longitudinally therein and by reason of the casing being made up of stacked and bonded together ring-like means, mass reduction of the casing is minimized in forming grid patterns therein to control the shape of the fragments to be produced. Consequently, the mass and thickness of the casing is controlled with greater precision and thereby enables the formation of a greater range of fragments in shape, size and mass. Depending upon the production requirements in forming a casing, it can be formed from either progressively stacked and bonded ring-like means or by an endless length of rod or wire-like means progressively wound about a mandrel so as to form in effect stacked elements in uninterrupted and continuous fashion. Regardless which production technique is used in forming a casing of the invention, a suitable ferrous material or an alloy thereof may be used for the casing, e.g., a mild carbon steel. Further, depending upon the bonding requirements between adjoining ring-like means of a casing being formed, either a laser or electron beam bonding apparatus may be used.

Other objects, advantages and novel features of this invention will become apparent from the following detailed description of the invention when considered in conjunction with the accompanying drawings wherein:

DETAILED DESCRIPTION OF THE INVENTION

Figure 1:
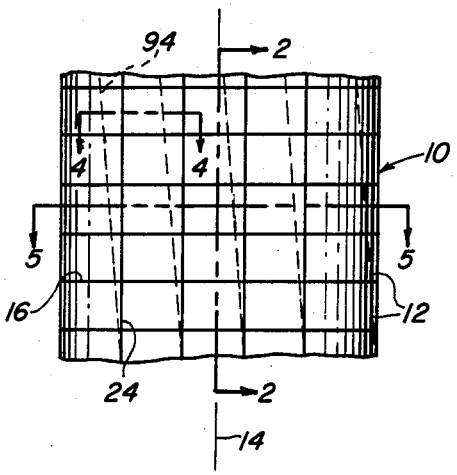
FIG. 1 is a fragmented diagrammatic view of an embodiment of an improved warhead casing of selected configuration and controlled fragmentable design in accordance with the teachings of the invention.
Figure 2:
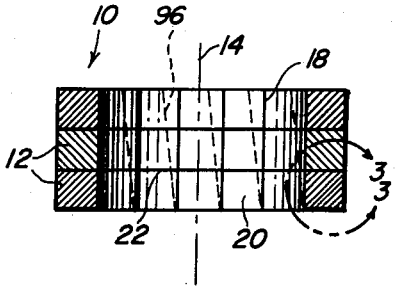
FIG. 2 is a longitudinal sectional and diagrammatic view with parts removed as taken along line 2—2 of FIG. 1.
Figure 3:
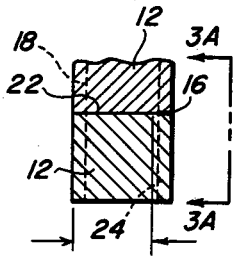
FIG. 3 is an enlarged sectional view within the bounds of circumscribing line 3—3 of FIG. 2 and illustrates further details of the invention.
Figure 4:
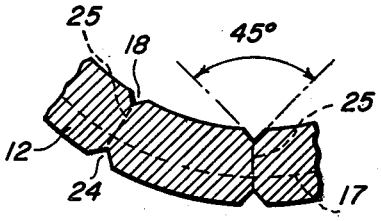
FIG. 4 is an enlarged fragmented cross-sectional view as taken along line 4—4 of FIG. 1.

With further reference to FIG. 1, an improved explosive warhead and fragmentable casing 10 of the invention is generally made up of a plurality of stacked and longitudinally aligned ring-like means 12 concentrically disposed about axis 14 of the casing. Each ring-like means 12 may be of any suitable shape in transverse section but preferably is of either rectangular or square-shaped configuration as depicted in FIG. 2. Adjacent outer peripheral portions of adjoining ring-like means 12 on the outer annular surface of the casing are metallurgically bonded together to form a metallurgical bond 16 of washer-like shape throughout the circumferential extent of the adjoining ring-like means as indicated in FIG. 3. The bottom of the bond or its innermost radial extent from the outer annular surface of casing 10 is indicated by reference numeral 17 as depicted in FIG. 4. By reason of the bond between adjoining ring-like means 12 of the plurality of stacked rings 12 of casing 10, a unitized and impervious casing 10 is formed between its ends. Thus a series of relatively spaced annular bonds 16 are formed between the ends of the casing as best shown in FIG. 1.

A first series of relatively spaced and longitudinally extending grooves 18 are formed on and about interior annular surface 20 of casing 10 as shown in FIG. 2. Each of the grooves are preferably uniformly spaced relative to each other. Adjacent inner peripheral surface portions of adjoining ring-like means 12 of casing 10 are disposed in interfacial engagement so as to form in effect an inner annular surface area or line of contact 22 therebetween as best shown in FIG. 3. The inner annular surface area of contact 22 is transverse of casing axis 14 and planar aligned with its associated bond 16 at the outer periphery of the adjoining ring-like means. As further evident in FIG. 3, the depth or radial extent of the surface area of contact 22 throughout its periphery is much greater than the depth of bond 16. By reason of each groove 18 of the series intersecting each surface area of contact 22 at an inner peripheral portion thereof between adjoining ring-like means 12 of casing 10, an internal fragmentation grid pattern is formed in the casing.

A second series of relatively spaced and longitudinally extending grooves 24 are preferably formed on and about the outer annular surface of casing 10 as best shown in FIG. 1. Each one of the grooves 24 is uniformly spaced relative to the other grooves of the second series and is radially aligned with its associated groove 18 of the first series as illustrated in FIG. 4. Each of the grooves 18 and 24 of the first and second series are preferably of V-shaped configuration in transverse section of casing 10. Moreover, by reason of radially aligned and opposed grooves 18 and 24 for each ring-like means 12, an intended plane of fracture 25 along a radial line is defined therebetween as illustrated in FIG. 4. It is noted here that the number of radially aligned grooves 18 and 24 for each ring-like means 12 determines the number of fragments 30 produced by each ring-like means 12 that makes up a casing when the casing is subject to an internal explosive force during casing use. Thus, if there are a corresponding series of twelve (12) inner and outer grooves 18 and 24 on each ring-like means 12, there are eleven (11) fragments produced therefrom. Depending on the fragmentation design requirements of casing 10, the included angle of each groove 18 or 24 may be on the order of from thirty degrees to sixty degrees (30° to 60°). In one reduction to practice the included angle for any groove 18 or 24 was forty-five degrees (45°).

By reason of each one of the second series of grooves 24 intersecting an outer peripheral portion of each bond 16 between adjoining ring-like means 12 throughout the height of casing 10, an external fragmentation grid pattern is in effect formed about and on the outer annular surface of the casing. As shown in FIG. 3, the depth of each bond 16 is greater than the depth of each second groove 24 so as to assure that the imperviousness of explosive casing 10 is not adversely affected in forming a plurality of novel fragments 30 as will be subsequently described. It has been found that for casing 10 to form fragments in accordance with the invention, the total depth of a groove 18 of the first series together with a groove 24 of the second series should be one and four tenths (1.4) greater than the depth of circumferential bond 16. Further, the relationship between the depth of a groove 18 and the depth of a groove 24 should be that any groove 18 is at least twice as deep as any groove 24. As further indicated in FIGS. 3 and 3A, the width of a bond 16 is approximately equal to its depth. Of course, the width and depth of bond 16 depend on the bonding technique used and the particular material selected for casing 10. The width of the circumferential heat-affected zone (not shown) on either side of a bond 16 is on the order of ten percent to fifteen percent (10% to 15%) of the bond width.

Figure 5:
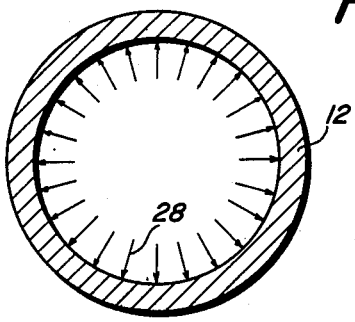
FIG. 5 is a cross-sectional and diagrammatic view as taken along line 5—5 of FIG. 1 with parts removed and illustrates an operative embodiment of the invention.
Figure 6:
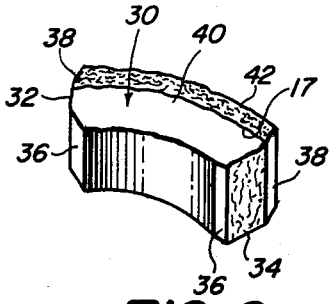
FIG. 6 is a perspective view of a representative fragment from a fragmented casing in accordance with the invention.

Whenever a casing 10 is subjected to a detonated explosive acting on its interior throughout the length of the casing, each ring-like means is subjected to uniform impulsive loading throughout its periphery as schematically shown by the series of radially directed vectors 28 in FIG. 5. As the result of this loading acting on casing 10, each ring-like means 12 thereof is broken into a plurality of uniformly-shaped fragments 30 of arcuate extent and block-like configuration such as a representative fragment 30 in the manner shown in FIG. 6. By reason of opposed and aligned grooves 18 and 24 for each ring-like means 12 along with the impulsive loading 28 to which each ring-like means 12 is subjected, any fragment 30 is formed with opposed rough end faces 32 and 34 along the pair of adjoining intended planes of fracture 25 that define the opposed arcuate ends of a fragment 30. Each end face 32 or 34 is interposed between inner and outer beveled surfaces 36 and 38 that define parts of opposed inner and outer aligned grooves 18 and 24. Similarly, inner top flat surface 40 of any fragment 30 stems from the surface area of contact 22 between adjoining ring-like means 12 of casing 10. A top rough surface area of arcuate extent 42 is formed when bond 16 is fractured as the result of the impulsive loading on casing 10. The width or radial extent of area 42 substantially corresponds to the depth of bond 16 between opposed ends of a fragment 30 of any ring-like means of casing 10. For the sake of brevity, the bottom inner and outer surface areas 40 and 42 of fragment 30 are not shown in FIG. 6. However, it is to be understood that each bottom surface area 40 or 42 of a fragment 30 substantially corresponds in width and arcuate extent to its corresponding top surface area 40 or 42 thereof. It is noted here that the plurality of fragments 30 formed from endmost ring-like means 12 of a casing 10 are provided with only one rough surface area 42 per fragment. Further, as evident in FIG. 6, the outer convex surface of a fragment 30 is of greater arcuate extent than the inner concave surface thereof.

Since impulsive loading of a casing 10 occurs along vectors 28, the greatest stress of a ring-like means 12 occurs circumferentially thereof. Thus, the greatest area of fracture due to shear occurs along the intended plane of fracture 25 between grooves 24 and 18 as indicated by opposed and fractured end faces 32 and 34 of a fragment. Conversely, since minimal impulsive stress occurs longitudinally of a casing 10, each fractured surface area 42 of a fragment 30 is advantageously of less area extent than either fractured end surface area 32 or 34 of a fragment 30. It is noted here that since any bond 16 is normally stronger than the material of adjoining ring-like means 12, the bond maintains the casing structure intact until maximum impulsive loading and casing fracture occurs thereby imparting the maximum velocity to each fragment 30 prior to striking a target. By reason of a casing 10 being made up of a stacked plurality of metallurgically bonded ring-like means 12 as aforedescribed, machining of the casing is minimized. At the same time, the initial line of separation or surface area of contact 22 between adjoining ring-like means 12 and 12 when casing 10 is formed is maintained until the casing is fragmented. Consequently, each fragment 30 as formed is subject to approximately no distortion or metal flow. Further, each formed fragment 30 has been found to approximate its intended configuration within about ninety-nine percent (99%) of its intended mass, shape and size. Moreover, micro cracking of any fractured area 42 and any fractured end faces 32 and 34 for a given fragment 30 is minimized. Thus, splintering of a fragment 30 when it impacts a hard target for all practical purposes doesn't occur since the improved fragment has in effect no micro cracks formed therein. By reason of the unique construction of casing 10 as aforedescribed in having internal and external grid patterns, casing 10 can be formed for producing a plurality of fragments having a wide range of shape, size and mass. For instance, each fragment formed from a casing can have a mass with a range from about thirty grains to about three hundred grains (30 grains to 300 grains). Hence casing 10 can be readily tailored to meet the design requirements of a weapon including its explosive used as well as the mass, shape and size requirements of casing fragments to be produced for penetrating a hard or soft target as the case may be.

Figure 7:
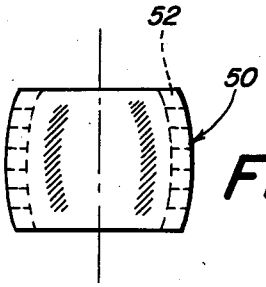
FIG. 7 is an elevational view of a modified casing configuration in accordance with the invention.
Figure 8:
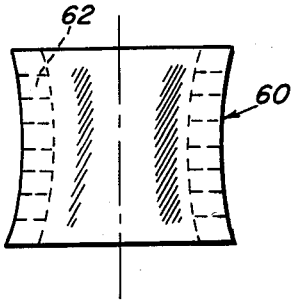
FIG. 8 is an elevational view of another modified casing configuration.

As depicted in FIG. 7 a casing 50 is of barrel-shaped configuration. The casing is made up of a plurality of stacked and metallurgically bonded ring-like elements 52 of progressively different radial extent between the ends of the casing. Similarly, as shown in FIG. 8, a casing 60 is of concave shape in longitudinal section between its ends. Each of the ring-like means 62 of casing 60 are also of progressively different radius between the ends of the casing, with the narrowest ring-like means being at the center thereof. Hence it is evident, depending upon the size and shape of a plurality of ring-like means and the manner in which they are stacked, that casing 10, 50 or 60 can have any suitable configuration other than shown.

Figure 9:
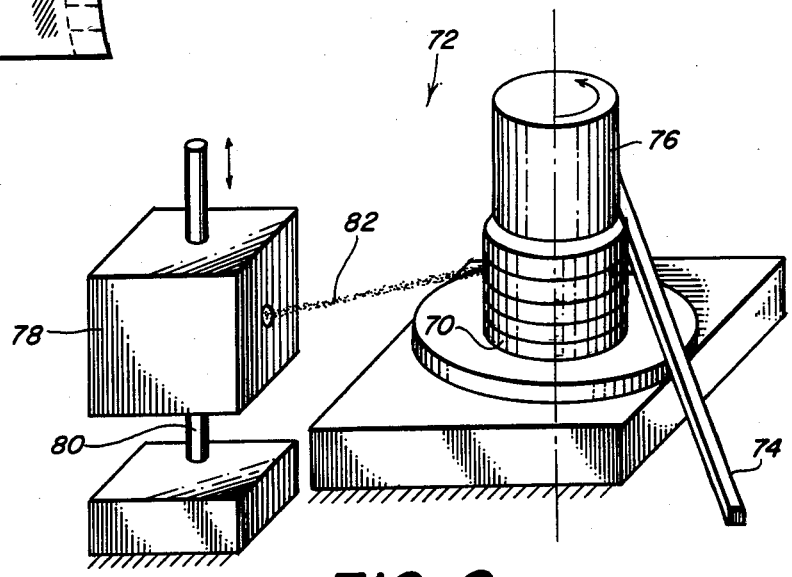
FIG. 9 is a combined perspective and schematic view that illustrates one technique for continuously forming an improved casing of the invention.

One technique for forming a cylindrical-like casing 70 in continuous and uninterrupted fashion is effected by a combined laser and coil forming apparatus 72 as depicted in FIG. 9. To this end, an endless length of a rod-like wire 74 is progressively wound about rotating mandrel 76 from the bottom to the top thereof. At the same time, a vertically adjustable optic-laser device 78 is timely advanced in either direction along columnar support 80 as a projected laser beam 82 metallurgically bonds forward adjacent outer peripheral portions of uppermost and immediately formed adjoining rib-like means as the casing is being progressively formed from the bottom to the top of mandrel or reel 76.

Figure 3A:
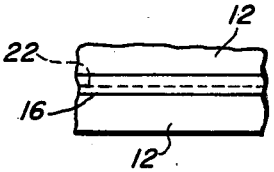
FIG. 3A is an elevational view taken along line 3A—3A of FIG. 3.
Figure 10:
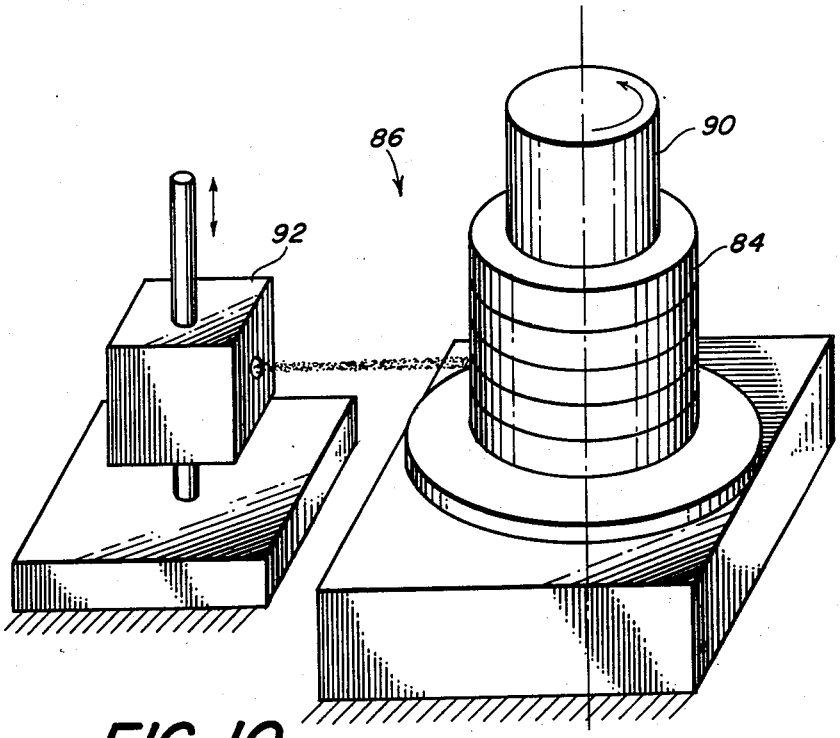
FIG. 10 is another combined perspective and schematic view of another technique for continuously forming an improved casing.

Another technique for forming a cylindrical-like casing 84 is effected by a similar apparatus 86 as depicted in FIG. 10. To this end, a plurality of ring-like means 88 are stacked on rotating mandrel 90. At the same time vertically adjustable laser device 92 metallurgically bonds adjoining ring-like means in progressive fashion as shown. By reason of the projected laser beam of either device 78 and 92, a precision metallurgical bond or weld of precise depth and width is formed between adjacent outer peripheral portions of adjoining ring-like means about the circumference thereof as shown in FIGS. 3 and 3A. It is noted here that by reason of various optic designs, not shown, for directing a laser beam, it is to be understood that the bond between adjoining ring-like means 12 of stacked ring-like means could be formed internally of casing 10 rather than externally as shown at 16 in FIGS. 1 and 3. Hence, if the bond were formed between adjacent inner peripheral portions of adjoining ring-like means of casing 10, e.g., the inner rough surface area (not shown) of a fragment 30 would be of less extent than outer surface area 42 thereof. Thus, less longitudinal stress would be required to form a plurality of fragments from adjoining ring-like means 12 of casing 10. Also, instead of the laser beam for techniques 72 and 86, an electron beam could be used. However, technique 72 or 86 in using an electron beam would have to be in a vacuum. By reason of weld 16, casing 10 after formation of the series of circumferential welds 16 therealong may be heat treated in a known manner.

Although both series of notches 18 and 24 have been shown to be at right angles to a plane transverse of casing 10, it is to be understood that these notches 18 and 24 could be inclined at an acute angle to the transverse plane. For example, external and internal series of notches 94 and 96 are disposed at an acute angle and are shown by dotted lines in FIGS. 1 and 2. One of the advantages in providing casing with an external and internal series of notches 94 and 96 is that the shape of a fragment 30 is changed from its block shape of FIG. 6 to a diamond-shaped configuration (not shown). One of the advantages in altering the configuration of a fragment 30 from block shape to diamond shape is that a diamond-shaped fragment provides a different distribution pattern when the casing is fragmented by an explosive. A suitable material for use in ring-like means 12 or endless rod 72 has been found to be a suitable alloy of ferrous material, e.g., a mild steel having the designation of AISI 1026. If a tougher casing is required in forming same for use in a weapon, tougher steels having the designation of either AISI 4140 or AISI 4340 may also be used. It is to be understood that casing 10, 50, or 60 could be made up of any suitable materials that are appropriately metallurgically bonded together in forming a casing other than those specified.

In forming casing 10, the series of notches 18 and 24 are preferably formed after bonding together all adjoining ring-like means 12 that make up a given casing 10, 50, 60, etc. However, the series of external and internal notches either could be preformed in each ring-like means 12 before stacking same to form a casing or could be preformed along an endless length of rod 72 being progressively would into the shape of a casing. Further, the series of external and internal notches instead of being radially aligned as best shown in FIG. 4 could be peripherally offset relative to each other or the spacing between notches of each series of external and internal notches could be nonuniform. Thus, when a casing has a series of external and internal notches that are peripherally offset relative to each other or the spacing between notches of either series is not uniform, the shapes of the plurality of fragments produced would be nonuniform.

Although not heretofore mentioned, casing 10, 50 or 60 could be made of a series of different hard and soft materials to meet weapon and/or target requirements. Thus, adjoining ring-like elements could be made up of hard and soft grades of steel. Such composite construction of the casing is achievable whether made of a plurality of selectively stacked rings 12 of different materials or a pair of rods or bar stock of different metal or alloy materials that are simultaneously helically wound about a mandrel in forming a casing, such as the casing formed by mandrel 90 in FIG. 10.

Obviously many modifications and variations of the present invention are possible in light of the above teachings. It is therefore to be understood that, within the scope of the appended claims, the invention may be practiced otherwise than as specifically described.

What is claimed is:

1. The method of forming a warhead casing of single wall construction and of fragmentation design so as to form a plurality of fragments, the method comprising the steps of:

stacking a plurality of ring-like means of predetermined size and shape in concentric relation about an axis so as to initially form a warhead casing of cylindrical-like configuration, metallurgically bonding together adjacent outer peripheral portions of adjoining ring-like means of the plurality so as to form a series of longitudinally spaced annular bonds about the outer periphery of the casing between its ends while at the same time maintaining adjacent inner end face portions about the inner periphery of each adjoining ring-like means of the plurality in interfacial engagement so as to form a series of longitudinally spaced inner peripheral lines of contact between the casing ends thereby forming a unitized casing made up of metallurgically bonded and interconnected ring-like means of the plurality, and forming a series of longitudinally extending and relatively spaced grooves on and about the interior annular surface of each ring-like means of the casing so as to form a line of weakness along each groove whereby the forming of the series of grooves in the interior annular surface of each ring-like means results in the formation of an internal fragmentation grid pattern made up of the series of inner grooves intersecting each inner peripheral line of contact between adjacent inner end face portions of adjoining ring-like means in order to enable the formation of a plurality of outwardly exploding fragments interposed between the series of grooves and the series of lines of contact about each ring-like means upon the warhead casing being subject to impulsive loading between its ends and about its interior when an explosive is detonated in the interior of the casing during its use.

2. The method as set forth in claim 1 wherein the casing is of barrel-like configuration.

3. The method as set forth in claim 1 wherein the casing is of concave shape in longitudinal section.

4. The method as set forth in claim 1 wherein each ring-like means of the plurality is of corresponding configuration and uniform size.

5. The method as set forth in claim 1 wherein certain ring-like means of the plurality are composed of one material while other ring-like means are composed of a different material.

6. The method as set forth in claim 1 wherein the step of bonding is effected by a laser beam.

7. The method as set forth in claim 1 wherein the step of bonding is effected by an electron beam.

8. The method as set forth in claim 1 wherein each ring-like means is of uniform shape in transverse section and wherein the series of grooves are uniformly spaced relative to each other so as to enable the formation of a plurality of fragments of uniform shape.

9. The method of forming a warhead casing of single wall construction and of fragmentation design so as to form a plurality of fragments, the method comprising the steps of:

stacking a plurality of ring-like means of predetermined size and shape in concentric relation about an axis so as to initially form a warhead casing of cylindrical-like configuration, metallurgically bonding together adjacent outer peripheral portions of adjoining ring-like means of the plurality so as to form a series of longitudinally spaced annular bonds about the outer periphery of the casing between its ends while at the same time maintaining adjacent inner end face portions about the inner periphery of each adjoining ring-like means of the plurality in interfacial engagement so as to form a series of longitudinally spaced inner peripheral lines of contact between the casing ends thereby forming a unitized casing made up of metallurgically bonded and interconnected ring-like means of the plurality forming a first series of longitudinally extending and relatively spaced grooves on and about the interior annular surface of each ring-like means of the casing so as to form a line of weakness along each formed groove, and forming a second series of longitudinally extending and relatively spaced grooves on and about the outer periphery of each ring-like means so as to form another line of weakness along each groove of the second series whereby the forming of the first and second series of grooves on the interior and exterior of each ring-like means of the casing results in the formation of opposed fragmentation grid patterns such that one grid pattern is made up of the first series of grooves intersecting each inner inner peripheral line of contact between adjacent inner end face portions of adjoining ring-like means and the opposed grid pattern is made up of the second series of grooves intersecting circumferentially spaced bond portions of each annular bond so as to enable the formation of a plurality of outwardly exploding fragments of block-like shape interposed between the first series of grooves and the series of lines of contact of each ring-like means and between the second series of grooves and the opposed and spaced fragmented bond portions of each ring-like means upon the warhead casing being subject to impulsive loading between its ends and about its interior when an explosive is detonated in the interior of the casing during its use.

10. The method as set forth in claim 9 wherein the depth of each groove means of the second series is less than the depth of each bond between adjoining ring-like means.

11. The method as set forth in claim 9 wherein the depth of each groove means of the first series is greater than the depth of each groove means of the second series.

12. The method as set forth in claim 9 wherein each groove of the first series is radially aligned with its associated groove of the second series.

13. The method as set forth in claim 9 wherein each groove of the first series is angularly offset about the axis of the casing from its associated groove of the second series.

14. The method as set forth in claim 9 wherein each groove of at least one of the series of the first and second series of grooves is of V-shaped configuration.

15. The method as set forth in claim 14 wherein the included angle of each V-shaped groove is on the order of from thirty degrees to sixty degrees (30° to 60°).

16. The method as set forth in claim 9 wherein each ring-like means is an integral part of a predetermined length of wire that can be progressively formed into a plurality of stacked ring-like means so as to form the casing.

17. The method as set forth in claim 9 wherein the steps of forming the first and second series of grooves is effected before the step of bonding.

18. The method as set forth in claim 9 wherein the step of forming the first series of grooves is such that the angle of each groove of the first series in relation to a plane transverse of the casing axis is an acute angle.

19. The method as set forth in claim 9 wherein the step of forming the second series of grooves is such that the angle of each groove of the second series in relation to a plane transverse of the casing axis is an acute angle.

20. A warhead casing having a fragmentation design for obtaining a plurality of fragments of predetermined size, shape and mass, said casing comprising:

casing means made up of a plurality of stacked-together and aligned ring-like means about the axis thereof;

adjacent outer peripheral portions of adjoining ring-like means being metallurgically bonded together so as to form a series of longitudinally spaced annular bonds about the outer periphery of the casing means between its end with each bond being between adjoining ring-like means while at the same time maintaining adjacent inner end face portions about the inner periphery of each adjoining ring-like means of the plurality in interfacial engagement so as to form a series of longitudinally spaced inner peripheral lines of contact between the casing means ends thereby forming a unitized casing means made up of metallurgically bonded and interconnected ring-like means, and a series of longitudinally extending and relatively spaced grooves formed on and about the interior annular surface of the casing means between its ends so as to form a line of weakness along each groove whereby an internal fragmentation grid pattern is formed in the interior annular surface of the casing means made up of the series of grooves intersecting each inner peripheral line of contact between adjacent inner end face portions of adjoining ring-like means in order to enable the formation of a plurality of outwardly exploding fragments interposed between the series of grooves and the series of lines of contact about each ring-like means upon the warhead casing means being subject to impulsive loading between its ends and about its interior when an explosive is detonated in the interior of the casing means during its use.

21. A warhead casing having a fragmentation design for obtaining a plurality of fragments of predetermined size, shape and mass, said casing comprising:

casing means made up of a plurality of stacked-together and aligned ring-like means about the axis thereof;

adjacent outer peripheral portions of adjoining ring-like means being metallurgically bonded together so as to form a series of longitudinally spaced annular bonds about the outer periphery of the casing means between its end with each bond being between adjoining ring-like means while at the same time maintaining adjacent inner end face portions about the inner periphery of each adjoining ring-like means of the plurality in interfacial engagement so as to form a series of longitudinally spaced inner peripheral lines of contact between the casing means ends thereby forming a unitized casing means made up of metallurgically bonded and interconnected ring-like means;

a first series of longitudinally extending and relatively spaced grooves formed on and about the interior annular surface of the casing means between its ends so as to form a line of weakness along each groove, whereby an internal fragmentation grid pattern is formed in the interior annular surface of the casing means made up of the first series of grooves intersecting each peripheral line of contact between adjacent inner end face portions of adjoining ring-like means, and a second series of longitudinally extending and relatively spaced grooves formed on and about the outer periphery of each ring-like means so as to form another line of weakness along each groove of the second series whereby an outer fragmentation grid pattern is formed made up of the second series of grooves intersecting circumferentially spaced bond portions of each annular bond so that both inner and outer grid patterns cooperate to assist in the formation of a plurality of outwardly exploding fragments of desired shape, size and mass interposed between the first series of grooves and the series of lines of contact of each ring-like means and between the second series of grooves and the opposed and spaced fragmented bond portions of each ring-like means upon the warhead casing means being subject to impulsive loading between its ends about its interior when an explosive is detonated in the interior of the casing means during its use.

22. A casing as set forth in claim 21 wherein the depth of each groove of the second series of grooves is less than the depth of each annular bond.

23. A casing as set forth in claim 21 wherein the depth of each groove of the first series is greater than the depth of the groove of the second series of grooves.

* * * * *